(12) United States Patent
Bissell et al.

(10) Patent No.: US 8,205,296 B1
(45) Date of Patent: Jun. 26, 2012

(54) PET GROOMING VACUUM ACCESSORY TOOL

(75) Inventors: Mary Catherine Bissell, Grand Rapids, MI (US); Justin Benequisto, Grand Rapids, MI (US); Steven Johnson, Grandville, MI (US)

(73) Assignee: BISSELL Homecare, Inc., Grand Rapids, MI (US)

( * ) Notice: Subject to any disclaimer, the term of this patent is extended or adjusted under 35 U.S.C. 154(b) by 479 days.

(21) Appl. No.: 12/416,379

(22) Filed: Apr. 1, 2009

Related U.S. Application Data (60) Provisional application No. 61/097,400, filed on Sep. 16, 2008.

(51) Int. Cl.
*A47L 5/00* (2006.01)
*A47L 9/06* (2006.01)
*A47L 9/02* (2006.01)
*A01K 13/00* (2006.01)

(52) U.S. Cl. ............................ 15/402; 15/421; 119/631

(58) Field of Classification Search .................... 15/402, 15/421; 119/611–633
See application file for complete search history.

(56) References Cited

U.S. PATENT DOCUMENTS

| | | | |
|---|---|---|---|
| 1,770,749 A | 7/1930 | Engeberg et al. | |
| 3,017,654 A * | 1/1962 | Allenby et al. | 15/327.7 |
| 3,574,885 A | 4/1971 | Jones | |
| 3,955,238 A | 5/1976 | Remijas | |
| 4,476,607 A * | 10/1984 | Ross | 15/339 |
| 5,095,853 A | 3/1992 | Kruger | |
| 5,502,873 A | 4/1996 | Hogan | |
| 5,768,747 A | 6/1998 | Smith | |
| 5,768,748 A | 6/1998 | Silvera et al. | |
| 6,055,938 A * | 5/2000 | Klein | 119/627 |
| 7,159,274 B2 | 1/2007 | Freidell | |
| 2002/0166512 A1 | 11/2002 | Corbett | |
| 2007/0169720 A1 * | 7/2007 | Roy | 119/615 |

\* cited by examiner

*Primary Examiner* — Bryan R Muller
(74) *Attorney, Agent, or Firm* — McGarry Bair PC (57) ABSTRACT

A vacuum accessory tool has a nozzle body with a suction opening and a hose section for connecting the accessory tool with a hose of an external vacuum source. The nozzle body includes a serrated blade that can be used for grooming a domestic animal. The nozzle body further comprises a transparent or semi-transparent tool hood for viewing the area being groomed. The nozzle body is pivotally mounted to the hose section by a rotatable cuff for rotation of the nozzle body relative to the hose section. Adaptors connect the vacuum accessory tool to multiple different size hoses of a variety of vacuum cleaners.

11 Claims, 5 Drawing Sheets

PET GROOMING VACUUM ACCESSORY TOOL

CROSS-REFERENCE TO RELATED APPLICATIONS

This application claims the benefit of U.S. Provisional Patent Application No. 61/097,400, filed Sep. 16, 2008, which is incorporated herein by reference in its entirety.

BACKGROUND OF THE INVENTION

1. Field of the Invention

The invention relates to vacuum cleaning accessory tools. In one of its aspects, the invention relates to an accessory tool adapted to be used for grooming an animal such as a pet, for example.

2. Description of Related Art

Grooming tools such as curry combs, bristles, brushes and other types of combs are used to separate hair that has been shed and other debris, such as dirt, dander and insects, from the skin and coat of an animal. The grooming tools can also stimulate the skin of the animal. The combination of a vacuum source with a grooming tool provides suction to remove the hair and debris picked up or disturbed by the grooming tool from the surface being groomed. The vacuum source also minimizes the amount of hair and debris that is released into the atmosphere during the grooming process.

U.S. Pat. Nos. 3,574,885, 3,955,238 and 5,502,873, disclose incorporating resilient, elastomeric bristles into the suction opening of an accessory tool that can connect to a vacuum source through a conduit. The bristles can be arranged to provide one or more channels for hair and other debris removed by the bristles to be evacuated through the vacuum conduit. The elastomeric material provides flexibility for grooming an irregular surface, such as the body of an animal. However, the flexible bristles may not be rigid enough to dislodge hardened debris or insects that are strongly attached to the skin or the coat of the animal.

U.S. Pat. Nos. 5,095,853, 5,768,748 and 7,159,274 disclose one or more rows of slightly resilient teeth made from a hard plastic material, similar to a traditional grooming comb, incorporated into the opening of an accessory tool connected with a vacuum source. U.S. Pat. Nos. 5,768,747, 6,055,938 and 7,159,274 and U.S. Patent Publication No. 2002/0166512 disclose one or more rows of plastic or metal blades, similar to a curry comb, incorporated into the opening of an accessory tool connected with a vacuum source. The one or more rows of a comb or a blade are often rigidly mounted to the accessory tool head providing little or no flexibility of the comb or blade relative to the tool head.

U.S. Pat. Nos. 1,770,749 and 6,055,938 disclose an arcuate blade with serrations or teeth, similar to a curry comb, incorporated into the opening of an accessory tool that can connect with a vacuum source. U.S. Pat. No. 1,770,749 discloses a spring mounted curry comb surrounded by brush bristles connected with the tool head of an accessory tool. U.S. Pat. No. 6,055,938 discloses an inlet opening to a conduit connected with the vacuum source that extends out over the surface that is being groomed. An arcuate blade with serrations or "teeth" surrounds the inlet opening and is mounted to a first tool head at each end of the arcuate blade. A second tool head is hingedly connected with the first tool head and extends over the area defined by the arcuate blade and down over the sides of the blade.

A similar accessory tool sold under the mark GROOMIE™ has an arcuate blade extending from the inlet opening of the vacuum source conduit. The tool head extends over the area defined by the arcuate blade and down over the sides of the blade. The arcuate blade is connected at each end with the accessory tool near the inlet opening. The blade is also pivotally connected near the apex of the arc to the tool head, providing for oscillation of the blade along an axis parallel to the suction flow from the inlet opening.

SUMMARY OF THE INVENTION

According to the invention, a vacuum accessory tool comprises a nozzle body with a suction opening and a hose section for connecting the accessory tool with the suction source, a handle and a tool head. The tool head can have an upper wall and a depending sidewall at least partially surrounding the upper wall. A blade can be mounted to the nozzle body in proximity to the suction opening for removing loose hair from pets. The blade can have an elongated arcuate shape that includes a lower edge and an upper edge. The upper edge can be adjacent to but spaced below the depending sidewall of the tool head to provide a gap between the depending sidewall and the upper edge of the blade, wherein air leaks through the gap to reduce suction pressure. The blade is mounted to the nozzle body such that the blade is fixed relative to the tool head to maintain the gap between the depending sidewall of the tool head and the upper edge of the blade, while still allowing lateral movement of the blade along a transverse axis relative to the nozzle body.

According to another embodiment of the invention, the blade can be mounted to the nozzle body for a minor articulation with respect to the nozzle body and can be mounted to the nozzle body through a two pin connection.

According to another embodiment of the invention, at least the upper wall of the nozzle body can be at least translucent for viewing the area being groomed by the blade.

According to yet another embodiment of the invention, the vacuum accessory tool can comprise a cuff rotatably mounting the handle to the hose section for rotation of the nozzle body relative to the hose section.

According to another embodiment of the invention, the vacuum accessory tool can comprise at least one adaptor to connect the hose section to one of a number of different size hoses of different size vacuum cleaners.

The invention provides an accessory tool that offers several advantages over the pet grooming tools. The arcuate blade is flexible and is connected with the accessory tool only at the ends thereof so that the blade can flex relative to the tool hood and the tool handle. While the blade and the connection with the accessory tool provide flexibility for maneuvering over the body of an animal, the blade is rigid enough to dislodge hardened debris or insects that can be strongly attached to the skin or the coat of the animal. In addition, the rotatable mounting of the cuff to the hose provides for rotation of the accessory tool with respect to the hose to further improve maneuverability of the accessory tool.

A significant advantage over the previous pet grooming tool is the inclusion of a translucent tool hood for viewing the area that is being groomed. The accessory tool is designed such that the view of the grooming area through the tool hood is not inhibited by any other components of the grooming or vacuum system.

DESCRIPTION OF THE PREFERRED EMBODIMENT

Figure 1:
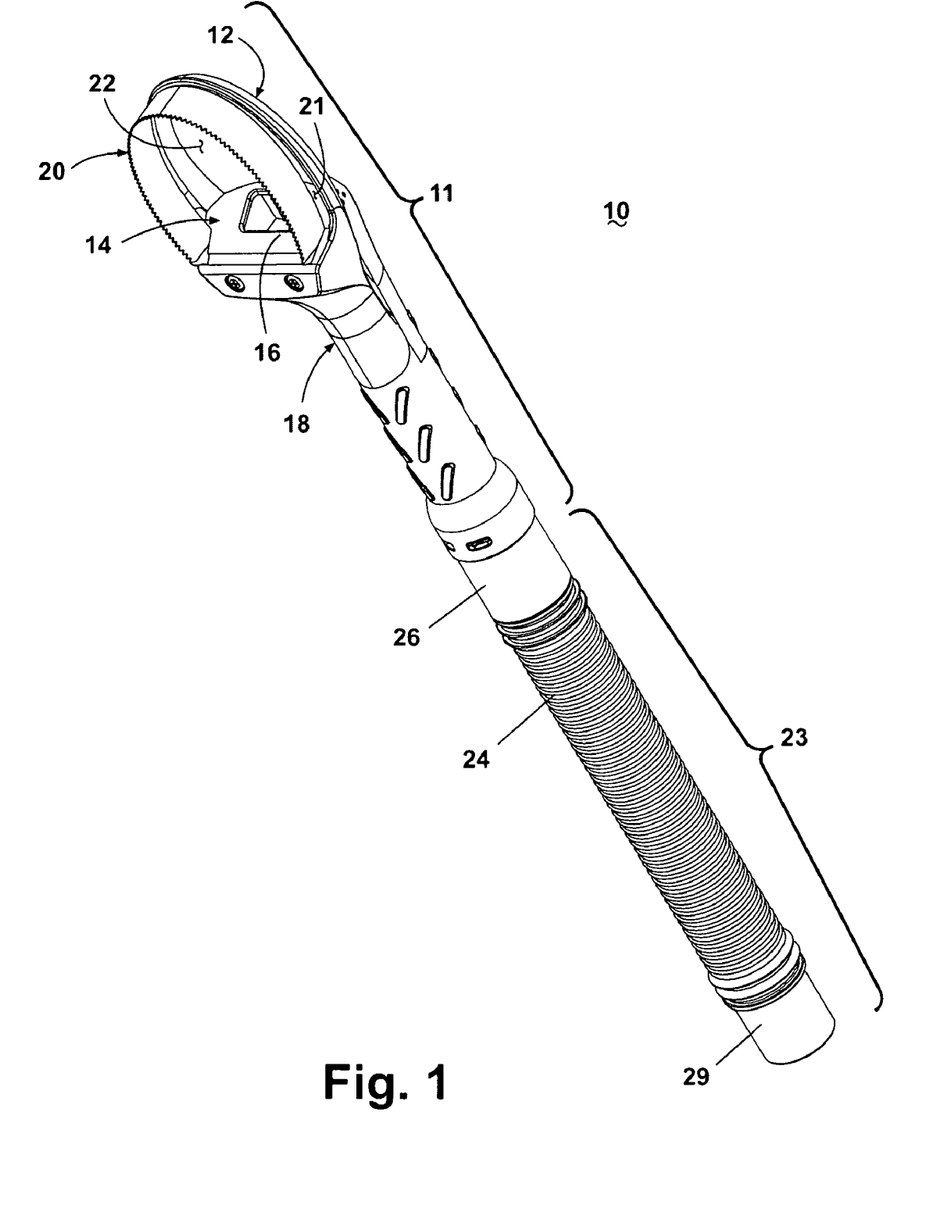
FIG. 1 is a perspective view of a vacuum accessory tool according to one embodiment of the invention.

Referring now to FIG. 1, a vacuum accessory tool 10 according to the invention comprises a nozzle body 11 formed by an upper body 12 and a lower body 14. A mounting body 18 mounts the lower body 14 to the underside of the upper body 12. A grooming blade 20 extends from one side of the lower body 14 to the other side, defining a generally arcuate-shaped opening 22. The lower body 14 further comprises a suction opening 16. The grooming blade 20 can be positioned relative to the upper body 12 to provide a gap 21.

The vacuum accessory tool 10 can also include a hose section 23 comprising a hose 24 and a rotatable cuff 26 for rotatably coupling the hose section 23 with the upper body 12. The accessory tool 10 can be fluidly connected with a remote vacuum source such as a conventional upright or canister vacuum cleaner, for example, by coupling a vacuum hose with the tool accessory 10 through a second end cuff 29.

Figure 2:
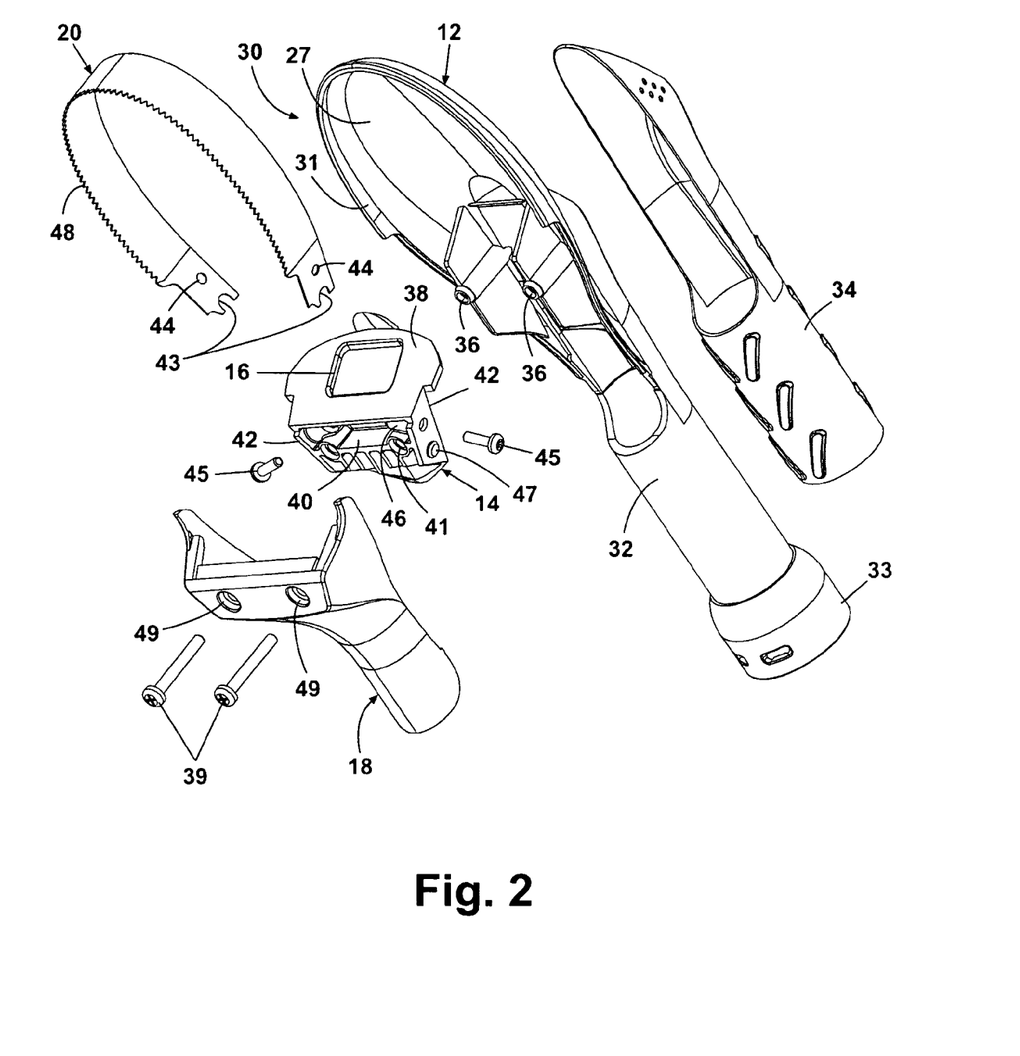
FIG. 2 is an exploded view of a nozzle body of the vacuum accessory tool shown in FIG. 1.

Referring now to FIG. 2, the upper body 12 can comprise a tool head 30 having an upper wall 27 and a depending sidewall 31 and an arm section 32. An end portion 33 is located at the distal end of the arm section 32 opposite the tool head 30 for connecting the upper body 12 with the rotatable cuff 26. The upper body 12 can be molded as a single piece of plastic that is at least translucent to lend user visibility to see through the plastic. The translucent plastic can have varying degrees of transparency and still provide at least partially transparency through the plastic. The upper body 12 can also be formed from multiple parts that may be formed from the same or different material. If the upper body 12 is formed from more than one part, it is preferable that at least the tool head 30 of the upper body 12 is made from a transparent or translucent material, such as plastic, for example.

A grip member 34 can be over-molded onto the arm section 32 of the upper body 12 and can extend partially or fully into the tool head 30. The grip member 34 is molded as a single piece from a suitable elastomeric material that can be chosen from natural or synthetic resins. The surface of the grip member 34 can include a raised, rectangular pattern as illustrated or any other regular or irregular pattern such as raised or indented circular, triangular, square or rectangular shapes to increase gripping ability for the user.

The upper body 12 also includes a pair of screw bosses 36 extending from the underside of the upper body 12 for mounting the lower body 14 to the upper body 12.

The lower body 14 comprises a front panel 38, a bottom panel 40 and a pair of side panels 42. The suction opening 16 is located within the front panel 38. The bottom panel 40 comprises a pair of apertures 41 that align with the screw bosses 36 of the upper body 12 for attaching the lower body 14 to the upper body 12 through screws 39 or other suitable fasteners.

The ends of the grooming blade 20 can be coupled with the lower body 14 through a notch 43 and a mounting aperture 44 located at a distal end of the grooming blade 20. A mounting pin or screw 45 extends through the mounting aperture 44 and is securely received by a shaft 46 extending inward from each side panel 42 of the lower body 14. The mounting screw 45 can comprise a threaded shaft for engagement with corresponding threads within the shaft 46. Alternatively, the mounting pin 45 can be in the form of a pin that is maintained within the shaft 46 by an interference fit, for example. Other suitable mechanical or non-mechanical types of fasteners can be used for connecting the grooming blade 20 with the lower body 14 without deviating from the scope of the invention. The notch 43 on the distal end of the grooming blade 20 can be received by a boss 47 located on the side panel 42. The notch 43 can be received by the boss to prevent rotation of the grooming blade 20 about the axis defined by the mounting pin 45. While the grooming blade 20 is securely attached at the ends of the grooming blade, it is still capable of flexing laterally along a transverse axis relative to the nozzle body 11.

The grooming blade 20 can be made from a hard material such as metal, for example, carbon steel or stainless steel, or plastic. In one embodiment the grooming blade 20 is made from a flexible steel blade. The grooming blade 20 can also include a row of teeth or serrations 48 on one edge thereof. The serrations 48 can extend completely or partially along the length of the edge of the grooming blade 20.

The grooming blade 20 can be attached to the lower body 14 at opposite ends forming an arc that generally follows the perimeter of the tool head 30. The arc formed by the grooming blade 20 defines the opening 22 that can have an area less than or equal to the area generally defined by the tool head 30. The grooming blade 20 can be spaced from the sidewall 31 of the tool head 30 to provide the gap 21 between the grooming blade and the hood region of the upper body 12.

The mounting body 18 comprises a pair of apertures 49 for attaching the mounting body 18 with the upper body 12. The mounting body 18 mounts the lower body 14 with the upper body 12 by receiving the bottom panel 40 and the side panels 42 of the lower body 14. The apertures 49 in the mounting body 18 align with the apertures 41 in the bottom panel 40 of the lower body 14 and the screw bosses 36 of the upper body 12. Screws 39 are received through the apertures 49 of the mounting body 18 and extend through the apertures 41 in the lower body 14 and are threadably received by the screw bosses 36 that extend from the upper body 12.

While the attachment of the grooming blade 20 to the lower body 14 and the attachment of lower body 14 to the upper body 12 with the mounting body 18 has been described using mechanical attachments, such as screws, it is contemplated that other mechanical attachments, such as rivets, bolts or pins, and non-mechanical attachments, such as adhesives or welds, for example, can also be used.

While the tool head 30 and the grooming blade 20 have been illustrated having a generally arcuate shape, the tool head 30 and grooming blade 20 can have any suitable shape such as a generally square, rectangular or triangular shape, for example.

Figure 3:
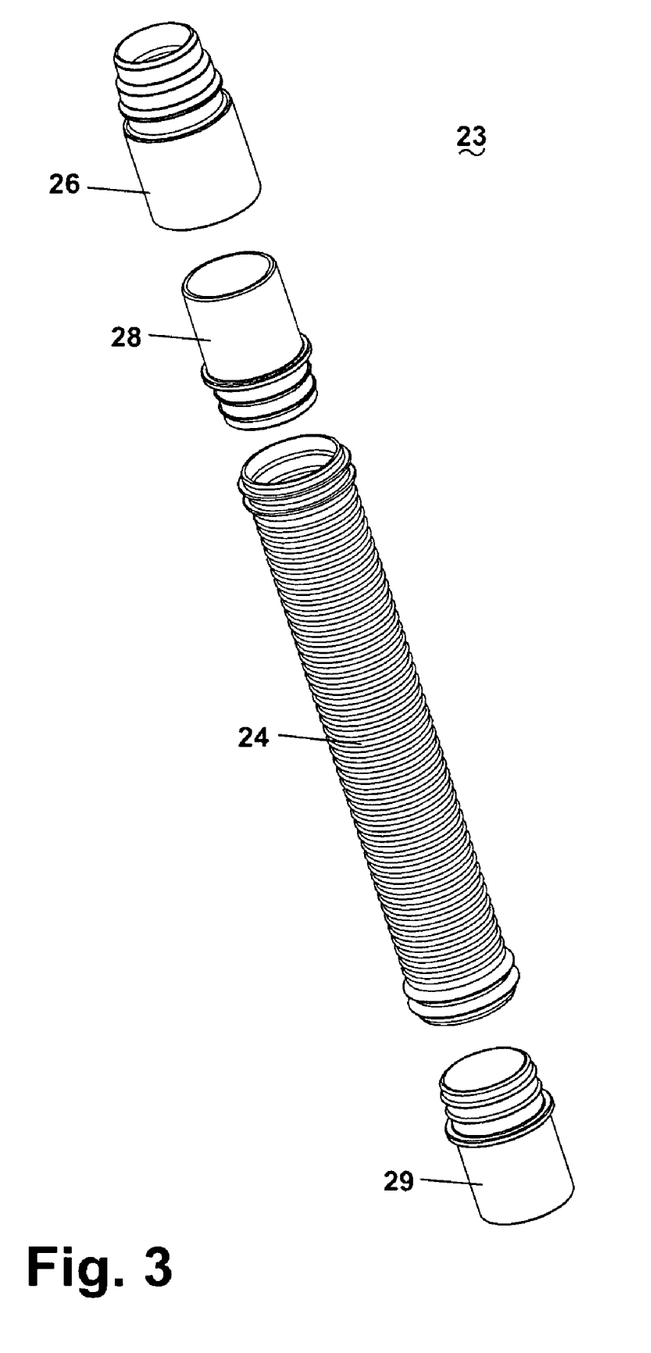
FIG. 3 is an exploded view of a hose section of the vacuum accessory tool shown in FIG. 1.

Referring to FIG. 3, the hose section 23 comprises a flexible hose 24 preferably made of plastic, although other materials can be used without deviating from the scope of the invention. As illustrated in FIG. 3, the hose 24 comprises ridges continuous along its entire length; however, the ridges can be discontinuous, extend over only a portion of the length of the hose 24 or not be present at all. The hose 24 can have any suitable length. The hose section 23 also comprises a first end cuff 28 and a second end cuff 29 located at a first and second end of the hose 24, respectively, that can be fixed or rotatable relative to the hose 24. The first end of the hose 24 is connected with the nozzle body 11 through the first end cuff 28; the second end cuff 29 connects the second end of the hose 24 with the external vacuum source such as a conventional vacuum cleaner.

The hose section 23 further comprises a rotatable cuff 26 for mounting the nozzle body 11. The rotatable cuff 26 has a first end sized for rotatable receipt within the end portion 33 of the arm section 32 of the upper body 12 (FIG. 2). The second end of the rotatable cuff 26 is sized for receipt of the first end cuff 28 therein. The first end cuff 28 is connected with the rotatable cuff 26 by a press fit connection and can rotate within the hose 24.

Figure 4:
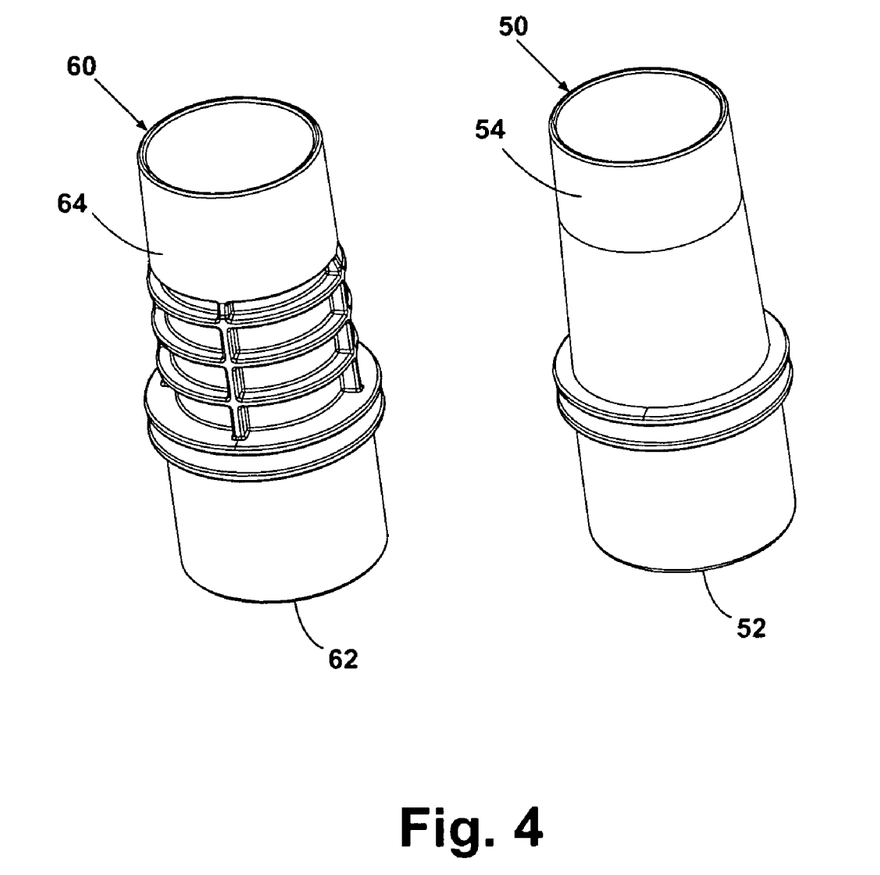
FIG. 4 is a perspective view of a pair of adaptors for connecting the vacuum accessory tool shown in FIG. 1 with different hose sizes of conventional vacuum cleaners, according to another embodiment of the invention.

Referring to FIG. 4, a first adaptor 50 and a second adaptor 60 for attaching the accessory tool 10 to a vacuum hose of a suction source, such as a conventional upright or canister vacuum cleaner, for example, are illustrated according to an embodiment of the invention. The first adaptor 50 is comprised of a first end 52 and a tapered second end 54. The first end 52 connects with the second end cuff 29 of the hose section 23 through a pressure fit. The tapered second end 54 is able to connect with vacuum hoses having a variety of diameters depending on the make and model of the vacuum cleaner. The vacuum hose nozzle can be accommodated within the tapered second end 54 or the tapered second end 54 can be accommodated within the nozzle of the vacuum hose through a pressure fit.

Some vacuum hoses may not fit with the first adaptor 50, so the second adaptor 60 can be used alone or in conjunction with the first adaptor 50 to connect the accessory tool 10 with a vacuum hose of a vacuum cleaner. The second adaptor 60 has a first end 62 and a second tapered end 64 comprising three rings of slightly different diameters. The rings decrease the thickness of the material in the second end 64 of the second adaptor 60. The second adaptor 60 can accommodate vacuum hoses with diameters that are too small to form a pressure fit with the first adaptor 50. The vacuum hose nozzle can be accommodated within the tapered second end 64 or the tapered second end 64 can be accommodated within the nozzle of the vacuum hose through a pressure fit.

Figure 5:
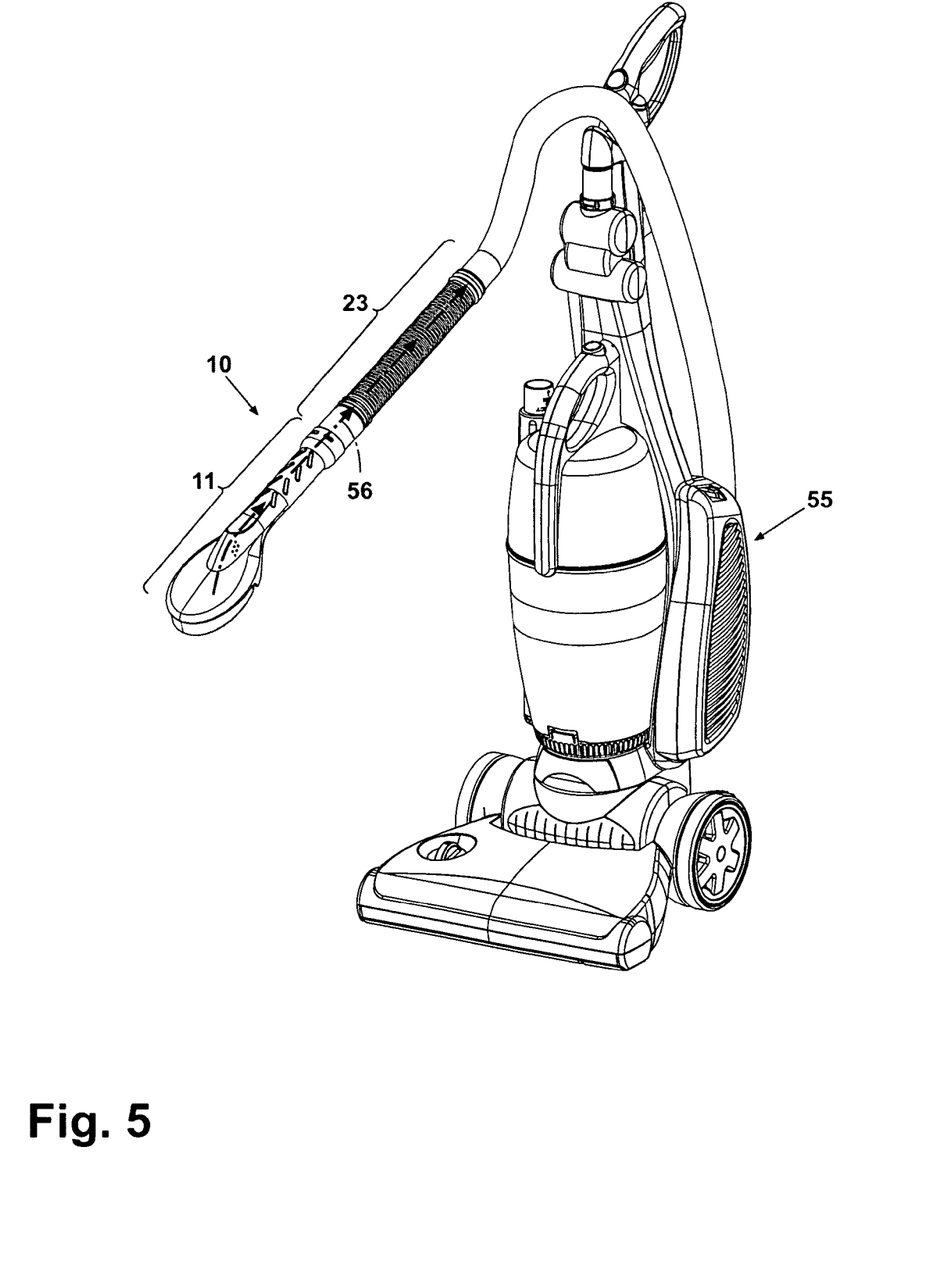
FIG. 5 illustrates the accessory tool shown in FIG. 1 connected to an upright vacuum cleaner.

FIG. 5 illustrates the accessory tool 10 connected with a remote suction source such as a conventional upright or canister vacuum cleaner 55, for example, according to an embodiment of the invention. The accessory tool 10 can be connected with most brands and models of household upright and canister vacuum cleaners by using one or both of the first and second adaptors 50 and 60, or directly connected to the accessory tool 10 through the second end cuff 29. The arm section 32 of the upper body 12 and the hose section 23 form part of an air conduit 56 that fluidly connects the suction opening 16 with the vacuum cleaner 55. When the vacuum cleaner 55 is activated, unattached or weakly attached debris within the opening 22 defined by the tool head 30 and the grooming blade 20 will be evacuated into the air conduit 56 through the suction opening 16.

The grooming blade 20 is capable of penetrating the coat of an animal and loosening shed hair and other debris, such as hardened dirt, dander and insects, from the coat and skin of an animal. The serrations 48 on the grooming blade 20 help facilitate the loosening of hair and other debris. As the accessory tool 10 is moved over the body of the animal during the grooming process, hair and debris that is loosened by the grooming blade 20, is moved into the opening 22 defined by the grooming blade 20 and evacuated through the suction opening 16 and into the air conduit 56 where it is eventually deposited in a collection chamber of the vacuum cleaner 55.

The rotatable cuff 26 rotatably coupling the nozzle body 11 to the hose section 23 provides maneuverability to the user during the grooming process as the accessory tool is moved over the irregular surface of the body of an animal. The rotatable coupling provides rotation of the nozzle body 11 and hence the grooming blade 20 around an axis parallel to the flow of the vacuum through the suction opening 16. Additional maneuverability and flexibility of the accessory tool 10 is provided by the coupling of the grooming blade 20 to the nozzle body 11. Because the grooming blade 20 is only attached at the ends, the grooming blade 20 can flex laterally along a transverse axis relative to the nozzle body 11 as it is moved over the body of an animal during the grooming process. The flexing movement of the blade can be facilitated by providing the gap 21 between the grooming blade 20 and the sidewall 31 of the tool head 30. While the grooming blade 20 and the connection with the nozzle body 11 provide flexibility for maneuvering over the body of an animal, the grooming blade 20 is still rigid enough to dislodge hardened debris or insects that can be strongly attached to the skin or the coat of the animal.

The translucent tool head 30 provides the user with the ability to view the area being groomed. This feature provides more flexibility in monitoring the grooming process and avoiding any sensitive areas on the animal. This feature can also be useful when checking the health of the coat and skin of the animal such as looking for rashes or ticks that may have adhered to the skin or coat of the animal.

As can be seen best in FIG. 1, the upper wall 27 of the tool head 30 can extend over the area defined by the grooming blade 20 but the sidewall 31 does not extend over an upper edge of the grooming blade 20, providing the gap 21. The gap 21 can serve as an air leak to minimize excessive suction from the vacuum source. Excessive suction can decrease the efficiency of the grooming process by inhibiting fluid movement of the accessory tool 10 over the surface of the animal. Excessive suction can also be uncomfortable for the animal being groomed.

While the invention has been specifically described in connection with certain specific embodiments thereof, it is to be understood that this is by way of illustration and not of limitation. Reasonable variation and modification are possible within the scope of the foregoing description of the invention without departing from the spirit of the invention which is defined in the appended claims.

What is claimed is:

1. A vacuum accessory tool comprising:
a nozzle body with a suction opening and a hose section for connecting the accessory tool with a suction source, a handle and a tool head;
the tool head having an upper wall and a depending sidewall at least partially surrounding the upper wall;
a blade mounted to the nozzle body in proximity to the suction opening for removing loose hair from pets, the blade having an elongated arcuate shape that includes a lower edge and an upper edge, the upper edge of the blade being adjacent to, but spaced below, the depending sidewall of the tool head to provide a gap between the depending sidewall and the upper edge of the blade, wherein air leaks through the gap to reduce suction pressure; and
wherein the blade is mounted to the nozzle body such that the blade is fixed relative to the tool head to maintain the gap between the depending sidewall of the tool head and the upper edge of the blade, while still allowing lateral movement of the blade along a transverse axis relative to the nozzle body.

2. A vacuum accessory tool according to claim 1 wherein the blade has a serrated edge for grooming pets.

3. A vacuum accessory tool according to claim 2 wherein the blade is made from a resilient metal.

4. A vacuum accessory tool according to claim 3 wherein the blade is mounted to the nozzle body only at the ends of the blade and is otherwise free from connection to the nozzle body.

5. A vacuum accessory tool according to claim 2 wherein the blade is mounted to the nozzle body only at the ends of the blade and is otherwise free from connection to the nozzle body.

6. A vacuum accessory tool according to claim 1 wherein the blade is mounted to the nozzle body through a two pin connection at the ends of the blade.

7. A vacuum accessory tool according to claim 1 wherein at least the upper wall of the tool head is at least translucent for viewing an area being groomed by the blade.

8. A vacuum accessory tool according to claim 1, further comprising a rotatable cuff pivotally mounting the handle to the hose section for rotation of the nozzle body relative to the hose section.

9. A vacuum accessory tool according to claim 1, further comprising at least one adaptor to connect the hose section to one of a number of different size hoses of different size vacuum cleaners.

10. A vacuum accessory tool according to claim 1 wherein the blade is made from a resilient metal.

11. A vacuum accessory tool according to claim 1 wherein the blade is mounted to the nozzle body only at the ends of the blade and is otherwise free from connection to the nozzle body.

\* \* \* \* \*

UNITED STATES PATENT AND TRADEMARK OFFICE
CERTIFICATE OF CORRECTION

| | | |
|---|---|---|
| PATENT NO. | : 8,205,296 B1 | Page 1 of 1 |
| APPLICATION NO. | : 12/416379 | |
| DATED | : June 26, 2012 | |
| INVENTOR(S) | : Mary Catherine Bissell et al. | |

It is certified that error appears in the above-identified patent and that said Letters Patent is hereby corrected as shown below:

In the Specification:
Column 2, Summary of the Invention, is missing ¶9 from the application as filed.

Insert on line 29 as a new paragraph

--[0009] According to another embodiment of the invention, the blade has a serrated edge for grooming pets and can be made from stainless steel. The blade can be mounted to the nozzle body only at the ends of the blade and is otherwise free from connection to the nozzle body.--

Signed and Sealed this
Twenty-eighth Day of August, 2012

David J. Kappos
*Director of the United States Patent and Trademark Office*